F. J. CLEAVER.
MEANS FOR INFLATING PNEUMATIC TIRES.
APPLICATION FILED APR. 9, 1915.
Patented Dec. 7, 1915.
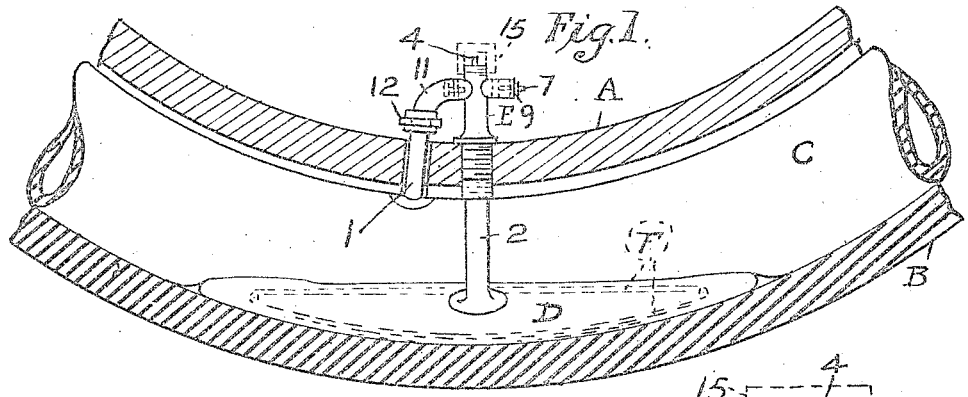
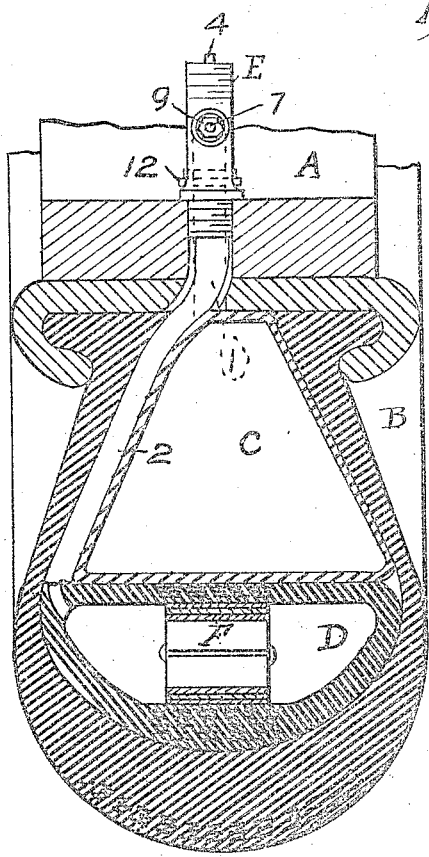
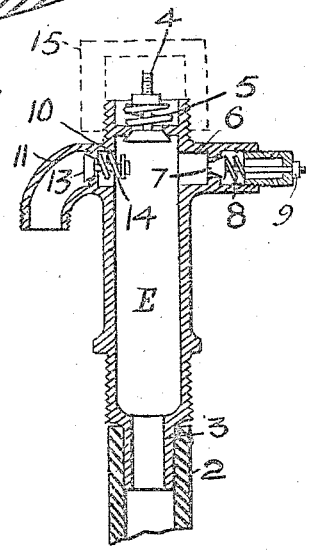

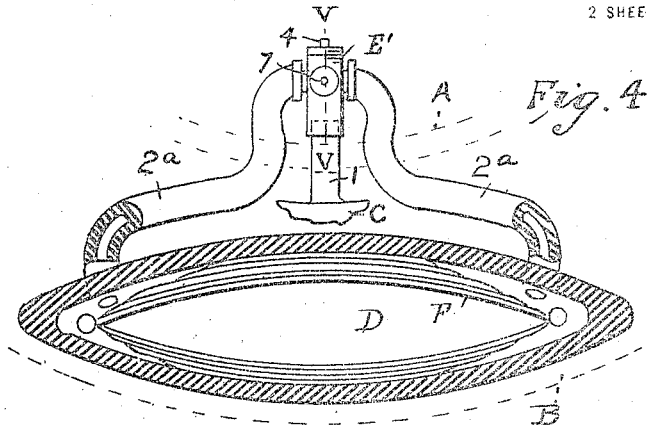
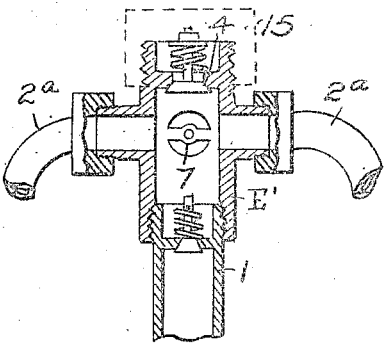
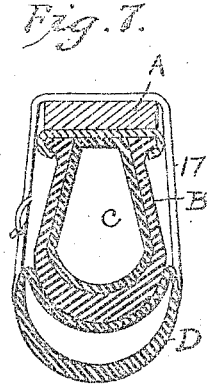
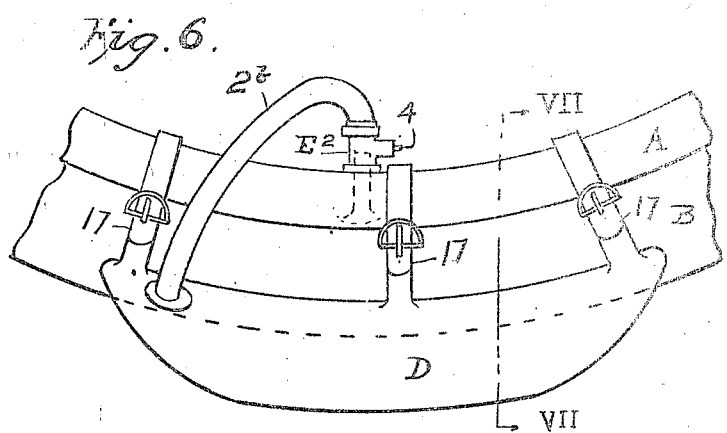

UNITED STATES PATENT OFFICE.

FREMONT J. CLEAVER, OF CARNEGIE BOROUGH, PENNSYLVANIA, ASSIGNOR OF ONE-FOURTH TO SAMUEL L. H. MORRIS, ONE-FOURTH TO HERBERT W. HODGDON, AND ONE-FOURTH TO EDWIN T. BARON, ALL OF PITTSBURGH, PENNSYLVANIA.

MEANS FOR INFLATING PNEUMATIC TIRES.

1,163,219.   Specification of Letters Patent.   Patented Dec. 7, 1915.

Application filed April 9, 1915. Serial No. 20,145.

*To all whom it may concern:*

Be it known that I, FREMONT J. CLEAVER, a citizen of the United States, and residing in the borough of Carnegie, in the county of Allegheny and State of Pennsylvania, have invented or discovered new and useful Improvements in Means for Inflating Pneumatic Tires, of which the following is a specification.

My invention comprises new and improved means for inflating the pneumatic tires of vehicles.

More particularly it consists of an improved pumping or bellows mechanism applied to the wheel and alternately inflated and compressed as the wheel revolves and which pumps air into the inner tube or interior of the tire. Means are provided for automatically preventing excess inflation of the tire, and also for rendering the pumping mechanism inoperative when its use is not required.

In the accompanying drawings, Figure 1 is a broken detail, showing partly in section a portion of a vehicle wheel rim and its pneumatic tire fitted with my invention; Fig. 2 is an enlarged vertical cross section of the same; Fig. 3 is an enlarged vertical section of the valve mechanism taken at right angles to Fig. 2; Fig. 4 is a view similar to Fig. 1 showing a modified form of my invention, the rim and shoe being indicated by dotted lines, the inner tube being broken away and the bellows being shown in vertical section; Fig. 5 is an enlarged section of the valve mechanism taken along the line V—V in Fig. 4; Fig. 6 is a broken elevation showing another modification of my invention, and Fig. 7 is a section of the same along the line VII—VII in Fig. 6.

The following is a detailed description of the drawings, reference being first had to Figs. 1, 2 and 3.

A represents the rim of a vehicle wheel, and B the shoe and C the inner tube of a pneumatic tire mounted on said rim. The inner tube C is provided with the usual valve tube 1 which extends through the usual hole through the rim A.

D is an inclosed bellows or pump-sack, made of suitable material so as to be airtight, such as rubber and fabric or properly treated leather. Said bellows is preferably of substantially the contour shown in the drawings, and is inserted between the inner tube C and the tread portion of the shoe B, as shown. The sole inlet and outlet for said bellows consists of a tube 2 which extends around one side of the inner tube C and is forced over the reduced end 3 of a valve body E whose exterior is threaded so as to be screwed into a threaded hole in the rim A, as shown. The outer end of the valve body is provided with an inwardly opening inlet valve 4, normally held closed by a weak spring 5.

6 is a pressure relief port in the side wall of body E in which is mounted the outwardly opening valve 7 held closed by a spring 8 whose strength may be regulated to resist any determined pressure in body E by means of a bushing 9. Thus when the pressure in body E rises above the determined point, said relief valve 7 will automatically open and reduce said pressure to that predetermined. 10 is an outlet port in the wall of said valve body E from which leads a downwardly curved integral metal tube 11 which is connected with the free end of the valve tube 1 of the inner tube C by means of a coupler 12. The port 10 is provided with an outwardly opening valve 13, normally held closed by a weak spring 14, thus permitting air to pass from the valve body E when the valve 13 is open but preventing the escape of air from said inner tube C through said valve body.

15 is a cap which may be screwed down on the outer end of the valve body E to prevent the entrance of air through the valve 4 when desired.

To prevent the pressure in the inner tube C from holding the bellows D closed or collapsed, suitable means may be provided, either in the shape of the material of which the bellows is made or, as shown, by installing within said bellows a suitable resilient extender, such as the spring F which is of sufficient strength to resist the collapsing effect of tire pressure but which may be compressed when the weight of the vehicle is exerted on the bellows, as will be the case when the bellows is at the lowest point of the revolving wheel.

The operation of the above described mechanism is as follows: When the bellows is to be put into use, the cap 15 is removed from the valve body, and the tension of the spring 8 of the valve 7 adjusted to relieve when the desired pressure is exceeded. The vehicle is then started to move, whereupon when the bellows reaches the lowest point of the wheel, the weight of the vehicle will collapse the bellows, driving the air contained in the same up through the valve body E, port 10 and valve 14, tube 11 into the inner tube C. As the revolution of the wheel releases the weight of the vehicle from the bellows, the spring F will cause the bellows to extend, closing valve 13 and opening valve 4, again filling the bellows with air. It is thus evident that the bellows will be alternately extended and compressed, pumping air into the inner tube C, until the desired pressure is obtained in said inner tube, whereupon the relief valve 7 will prevent excess pressure in said inner tube.

When the cap 15 is screwed down on the end of the valve body E, no air can enter through the valve 4, and the pumping mechanism is inoperative. Thus only when the tire is to be pumped up is the cap 15 removed. Where a puncture has been experienced, the cap 15 may be removed and air pumped into the tire to compensate leakage until the leak may be fixed. Thus an automobilist need not stop to mend a puncture but may remove the cap 15 and permit the pumping mechanism to compensate for the leakage until the puncture may be conveniently mended.

In Figs. 4 and 5 I show a modification wherein the bellows D is provided with an air tube, 2ª leading from either end, thus preventing the formation of air pockets whatever direction the wheel revolves. Said tubes are led through holes in the rim A and connect with open ports 16 at the sides of the valve body E'. The inner end of said valve body is interiorly threaded to be attached to the end of the inner tube valve tube 1 which extends through the usual hole in the rim A. The inlet valve 4, the adjustable relief valve 7, and the screw cap 15 are the same as in the preceding figures.

In Figs. 6 and 7 I show a form of exterior bellows which, instead of being installed inside the shoe is made to be clamped outside on the tread of the tire by any convenient means, such as the straps 17. The air tube 2ᵇ leading from the bellows is attached to a valve body E², provided with an air inlet valve 4ª and connected to the inner tube. This form of bellows may be temporarily adjusted to the tread of the tire and the vehicle driven a short distance until the tire is pumped up, when the bellows may be removed. In mounting the bellows, the end thereof which is provided with the air tube 2ᵇ is pointed away from the direction of rotation, to avoid the formation of an air pocket in the bellows.

It is evident from the foregoing that my invention presents novel and advantageous means for pumping up tires for vehicles. The device is inexpensive and durable and accomplishes its work automatically and quickly, without employing power means of any kind. It may be readily applied to or supplied for any vehicle at small cost.

Although for the sake of clearness and illustration, I have minutely described the embodiment of my invention shown in the drawings, I do not wish to limit myself thereby but claim broadly:—

1. In combination with the rim of a vehicle wheel, an outer shoe mounted on said rim and a continuous inner tube surrounding said rim within said shoe, said rim being provided with a radial hole, means for inflating said inner tube when the vehicle is in motion comprising a removable bellows device interposed between the inner tube and the tread of the shoe at a point adjacent to the air valve of said inner tube and adapted to be alternately contracted and expanded by the rotation of the vehicle wheel, a valve body mounted in said radial hole and provided with an inlet valve and a port connected to the air valve of said inner tube, and an air pipe connected to said bellows device and led up around said inner tube within said shoe and connected to said valve body, substantially as and for the purpose described.

2. In combination with the rim of a vehicle wheel and a pneumatic tire mounted on said rim, said rim being provided with a radial hole, a removable bellows device attached to said tire and adapted to be alternately expanded and contracted by the rotary travel of the vehicle wheel along the road surface, a valve body mounted in said radial hole and provided with an inlet valve and a port connected to the air valve of said pneumatic tire, and an air pipe connected to said bellows device and said valve body, substantially as and for the purpose set forth.

Signed at Pittsburgh, Pa., this 6th day of April, 1915.

FREMONT J. CLEAVER.

Witnesses:
JOHN McKELVIE,
E. A. LAWRENCE.